(12) United States Patent
Fan et al.

(10) Patent No.: US 12,292,956 B2
(45) Date of Patent: May 6, 2025

(54) METHOD FOR SETTING PERMISSION OF APPLICATION, ELECTRONIC DEVICE AND STORAGE MEDIUM

(71) Applicant: BEIJING XIAOMI MOBILE SOFTWARE CO., LTD., Beijing (CN)

(72) Inventors: Lin Fan, Beijing (CN); Jingcheng Zhang, Beijing (CN); Dong Li, Beijing (CN); Le Wang, Beijing (CN); Weidong Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 273 days.

(21) Appl. No.: 17/488,081

(22) Filed: Sep. 28, 2021

(65) Prior Publication Data

US 2022/0309142 A1  Sep. 29, 2022

(30) Foreign Application Priority Data

Mar. 29, 2021 (CN) .......................... 202110334080.4

(51) Int. Cl.
 *G06F 21/44* (2013.01)
 *G06F 21/62* (2013.01)
 *G06F 3/04817* (2022.01)

(52) U.S. Cl.
 CPC .......... *G06F 21/44* (2013.01); *G06F 21/6245* (2013.01); *G06F 3/04817* (2013.01)

(58) Field of Classification Search
 CPC ... G06F 21/44; G06F 21/6245; G06F 3/04817
 See application file for complete search history.

(56) References Cited

U.S. PATENT DOCUMENTS

| | | | | |
|---|---|---|---|---|
| 8,694,920 B2* | 4/2014 | Kirtane | ................... | G06F 9/451 715/779 |
| 11,227,064 B1* | 1/2022 | Fakhraie | ............. | G06F 21/6218 |
| 11,689,577 B2* | 6/2023 | Majaniemi | ............. | H04L 63/10 726/1 |
| 2003/0191938 A1* | 10/2003 | Woods | ................ | G06F 21/6209 713/165 |

(Continued)

FOREIGN PATENT DOCUMENTS

| | | |
|---|---|---|
| CN | 103617389 A | 3/2014 |
| CN | 109766680 A | 5/2019 |

(Continued)

OTHER PUBLICATIONS

European Patent Application No. 21200241.4 extended Search and Opinion dated Mar. 3, 2022, 7 pages.

(Continued)

*Primary Examiner* — Techane Gergiso
(74) *Attorney, Agent, or Firm* — Cozen O'Connor

(57) ABSTRACT

A method for setting a permission for an application executing on an electronic device includes: detecting a first operation on a first display control; controlling a permission of a predetermined application to be invalid, in response to detecting the first operation; in which, the permission includes a permission capable of using the predetermined application or a permission incapable of using the predetermined application; and disabling launching the predetermined application in response to the invalid permission.

14 Claims, 14 Drawing Sheets

(56) References Cited

U.S. PATENT DOCUMENTS

| | | | |
|---|---|---|---|
| 2005/0075116 A1* | 4/2005 | Laird | A61B 5/1117 |
| | | | 455/414.1 |
| 2007/0129046 A1* | 6/2007 | Soh | H04M 1/72466 |
| | | | 455/403 |
| 2010/0077347 A1* | 3/2010 | Kirtane | G06F 3/04817 |
| | | | 715/846 |
| 2011/0002480 A1* | 1/2011 | Smith | H04M 1/72457 |
| | | | 381/104 |
| 2012/0149350 A1* | 6/2012 | Fan | H04M 1/72421 |
| | | | 455/418 |
| 2013/0067531 A1* | 3/2013 | Morris | G06F 21/54 |
| | | | 726/16 |
| 2013/0102363 A1* | 4/2013 | Jung | H04W 12/08 |
| | | | 455/566 |
| 2013/0159877 A1* | 6/2013 | Banti | G06Q 10/107 |
| | | | 715/752 |
| 2014/0283128 A1 | 9/2014 | Shepherd et al. | |
| 2014/0298420 A1* | 10/2014 | Barton | H04L 63/102 |
| | | | 726/4 |
| 2015/0237033 A1* | 8/2015 | Howell | H04L 63/08 |
| | | | 726/4 |
| 2016/0011731 A1* | 1/2016 | Pasquero | G06F 3/0487 |
| | | | 715/799 |
| 2016/0142413 A1* | 5/2016 | Diep | H04L 67/52 |
| | | | 726/4 |
| 2016/0232355 A1* | 8/2016 | Li | G06F 21/6245 |
| 2016/0378317 A1* | 12/2016 | Tian | G06V 40/1347 |
| | | | 345/173 |
| 2017/0147364 A1* | 5/2017 | Shaposhnikov | G06F 8/35 |
| 2017/0180964 A1* | 6/2017 | Mehta | H04W 12/06 |
| 2018/0020395 A1* | 1/2018 | Suyama | G06F 3/167 |
| 2018/0025553 A1* | 1/2018 | Bajwa | H04W 4/40 |
| | | | 701/32.6 |
| 2018/0288218 A1* | 10/2018 | Aravapalli | H04M 1/72457 |
| 2018/0349623 A1* | 12/2018 | Morard | G06F 21/6209 |
| 2019/0220542 A1* | 7/2019 | Estruch Tena | G06F 21/604 |
| 2020/0151348 A1* | 5/2020 | Chauhan | H04L 67/53 |
| 2020/0296564 A1* | 9/2020 | Whelen | H04W 12/02 |
| 2021/0400037 A1* | 12/2021 | Montgomerie | H04L 63/083 |
| 2022/0207162 A1* | 6/2022 | Singh | G06F 21/629 |
| 2022/0269800 A1* | 8/2022 | Cui | H04M 1/72463 |

FOREIGN PATENT DOCUMENTS

| | | | | |
|---|---|---|---|---|
| CN | 110908557 A | | 3/2020 | |
| EP | 3336741 A1 | | 6/2018 | |
| WO | WO-0127724 A1 * | | 4/2001 | G06F 21/6245 |

OTHER PUBLICATIONS

Chinese Patent Application No. 202110334080.4, Office Action dated Jan. 11, 2025, with English translation, 22 pages.

* cited by examiner

METHOD FOR SETTING PERMISSION OF APPLICATION, ELECTRONIC DEVICE AND STORAGE MEDIUM

CROSS-REFERENCE TO RELATED APPLICATION

This application is based on and claims priority to Chinese Patent Application No. 202110334080.4 filed on Mar. 29, 2021, the content of which is hereby incorporated by reference in its entirety into this disclosure.

TECHNICAL FIELD

The disclosure relates to the field of electronic device technologies, and particularly to a method for setting permissions for an application executed on an electronic device, an electronic device and a storage medium.

BACKGROUND

With the rapid development of wireless mobile communication network technologies, mobile terminals have become indispensable tools in people's life and work. A large number of applications that may involve personal or public privacy may be stored and executed on mobile terminals, for example, positioning applications and recording applications. These applications may obtain personal or public privacy information when permitted for use, which creates potential security hazards to personal or public privacy. Especially in scenarios having high-privacy requirements, the risks to privacy may be equivalently high. For example, during an important conference or meeting, information on the important conference or meeting may be easily leaked, which brings a high risk to conference security. Therefore, a secure mechanism for using an application to improve the security of using the application and reduce privacy leakage would address this problem.

SUMMARY

According to a first aspect of embodiments of the disclosure, a method for setting a permission of an application is provided. The method is applicable to an electronic device. The method includes: detecting a first operation on a first display control; controlling a permission of a predetermined application to be invalid, in response to detecting the first operation; in which, the permission includes a permission capable of using the predetermined application or a permission incapable of using the predetermined application; and disabling launching the predetermined application in response to the invalid permission.

According to a second aspect of embodiments of the disclosure, a display device is provided. The display device includes: a processor; and a memory configured to store instructions executable by the processor. The processor is configured to perform the any above method when executing the instructions.

According to a third aspect of embodiments of the disclosure, a non-transitory computer-readable storage medium is provided. When instructions in the storage medium are executed by the processor of the display device, the display device may perform the any above method.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Those skilled in the art should understand that a plurality of implementations in embodiments of the disclosure are set forth to provide a thorough understanding of the technical solutions of the embodiments of the disclosure. Of course, those skilled in the art may appreciate that various embodiments provided by the embodiments of the disclosure may be performed separately or may be performed together with other embodiments of the disclosure, or may be performed separately or in combination with some methods in the other related art, which are not limited herein.

Figure 1:
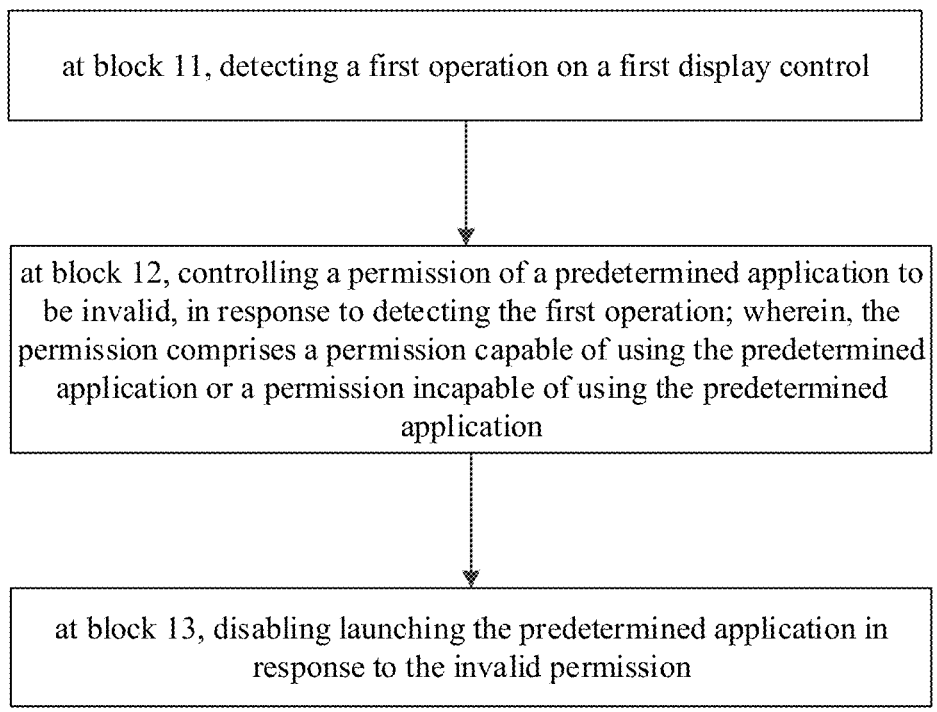
FIG. 1 is a flowchart illustrating a method for setting a permission of an application according to some embodiments.

FIG. 1 is a flowchart illustrating a method for setting a permission of an application according to some embodiments. As illustrated in FIG. 1, the method is applicable to an electronic device and includes the following.

At block 11, a first operation on a first display control is detected.

At block 12, a permission of a predetermined application is controlled to be invalid, in response to detecting the first operation. The permission includes a permission capable of using the predetermined application or a permission incapable of using the predetermined application.

At block 13, launching the predetermined application is disabled in response to the invalid permission.

The electronic device herein may be a terminal device with a display function. The terminal device herein may be a mobile terminal, a desktop computer or a smart home device, etc. The mobile terminal may be a mobile phone, a wearable device, a tablet computer, a notebook computer, etc. The smart home device may be a television, etc.

In some embodiments, the first operation may be a click operation, an input operation, a slide operation, or the like on the first display control using a touch screen of the electronic device. For example, the first operation may be the click operation on the first display control on the touch screen. For another example, the first operation may be the slide operation on the first display control on the touch screen. The first operation herein may be a touch operation.

In some embodiments, the first display control is configured with a switch button. The switch button has a first state of disabling (or closing) and a second state of enabling (or starting). The switch button may be switched between the first state and the second state based on the operation on the switch button.

In some embodiments, the switch button is switched from the first state to the second state in response to detecting the first operation on the first display control. The electronic device controls the permission of the predetermined application to be invalid, in response to the switch button being switched from the first state to the second state.

In some embodiments, the switch button is switched from the second state to the first state in response to detecting the second operation on the first display control. The electronic device controls the permission of the predetermined application to be valid, in response to the switch button being switched from the second state to the first state.

In some embodiments, the second operation may be a click operation, an input operation, a slide operation, or the like on the first display control on a touch screen of the electronic device. For example, the second operation may be the click operation on the first display control on the touch screen. For another example, the second operation may be the slide operation on the first display control on the touch screen. The second operation herein may be a touch operation.

Figure 2:
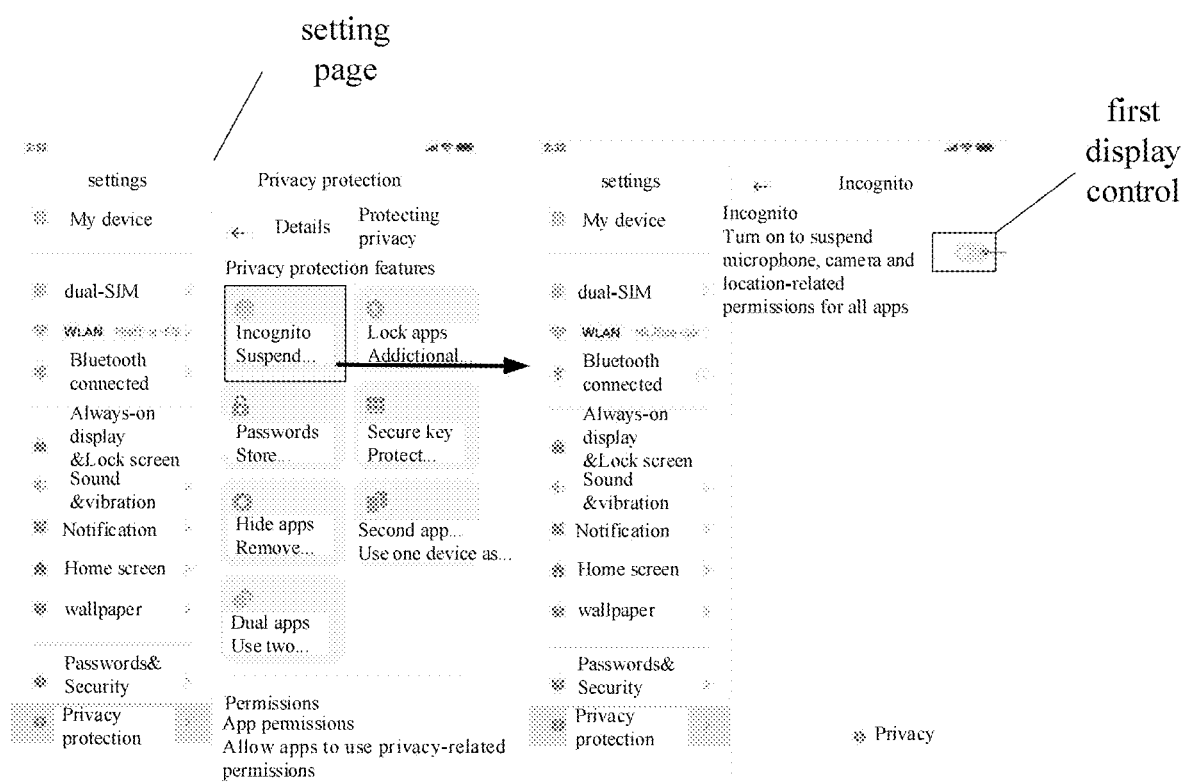
FIG. 2 is a diagram illustrating a method for setting a permission of an application according to some embodiments.

In some embodiments, the first display control may be configured on a setting interface for application and/or system settings of the electronic device. Referring to FIG. 2, a page containing the first display control may be entered from a stealth functional module of a setting page by receiving a predetermined operation. For example, a "privacy protection function" module may be entered from a "privacy protection" module in the setting interface, and then the page of the first display control may be entered.

In some embodiments, a confirmation control is displayed in response to detecting the first operation on the first display control; and the switch button is switched from the first state to the second state and the electronic device controls the permission of the predetermined application to be invalid, in response to detecting the confirmation operation on the confirmation control.

In other embodiments, a confirmation control is displayed in response to detecting the first operation on the first display control; and the switch button is not switched from the first state to the second state and the electronic device does not control the permission of the predetermined application to be invalid, in response to detecting the cancellation operation on the confirmation control.

Figure 3:
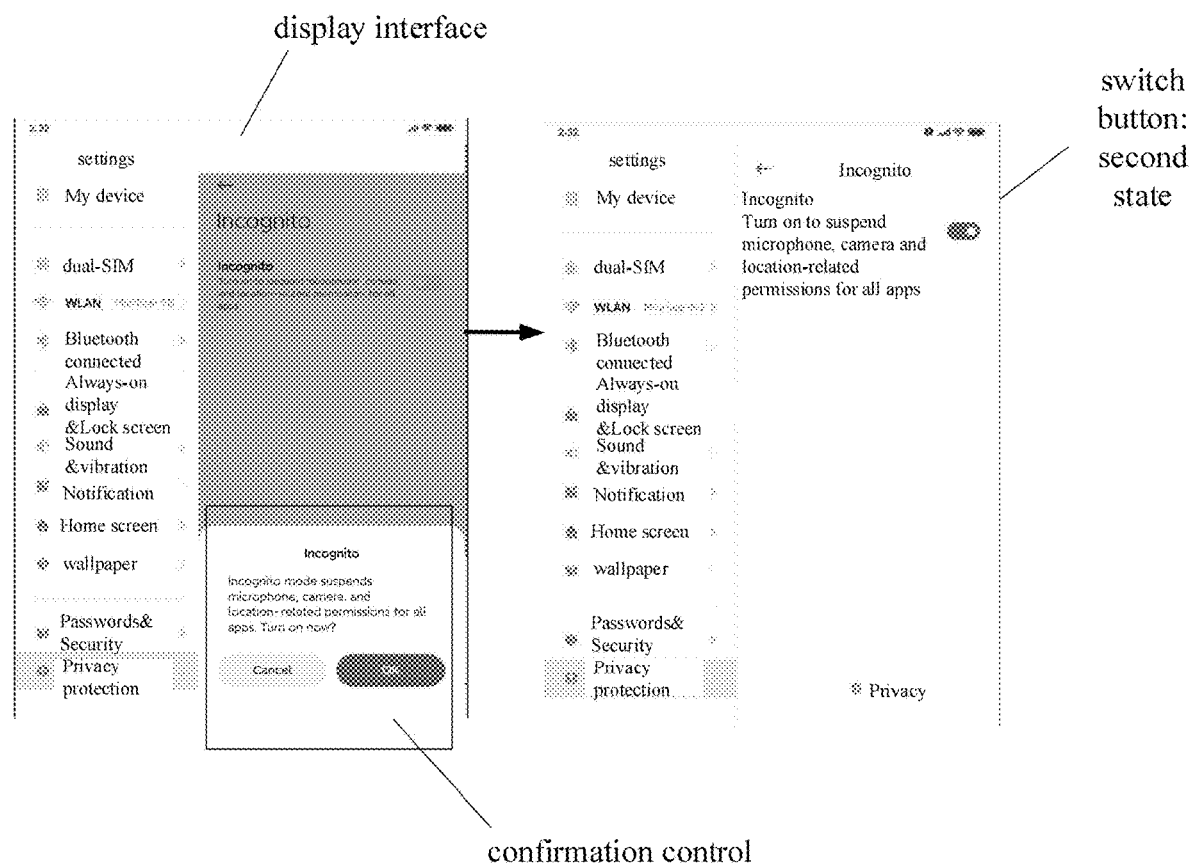
FIG. 3 is a diagram illustrating a method for setting a permission of an application according to some embodiments.
Figure 4:
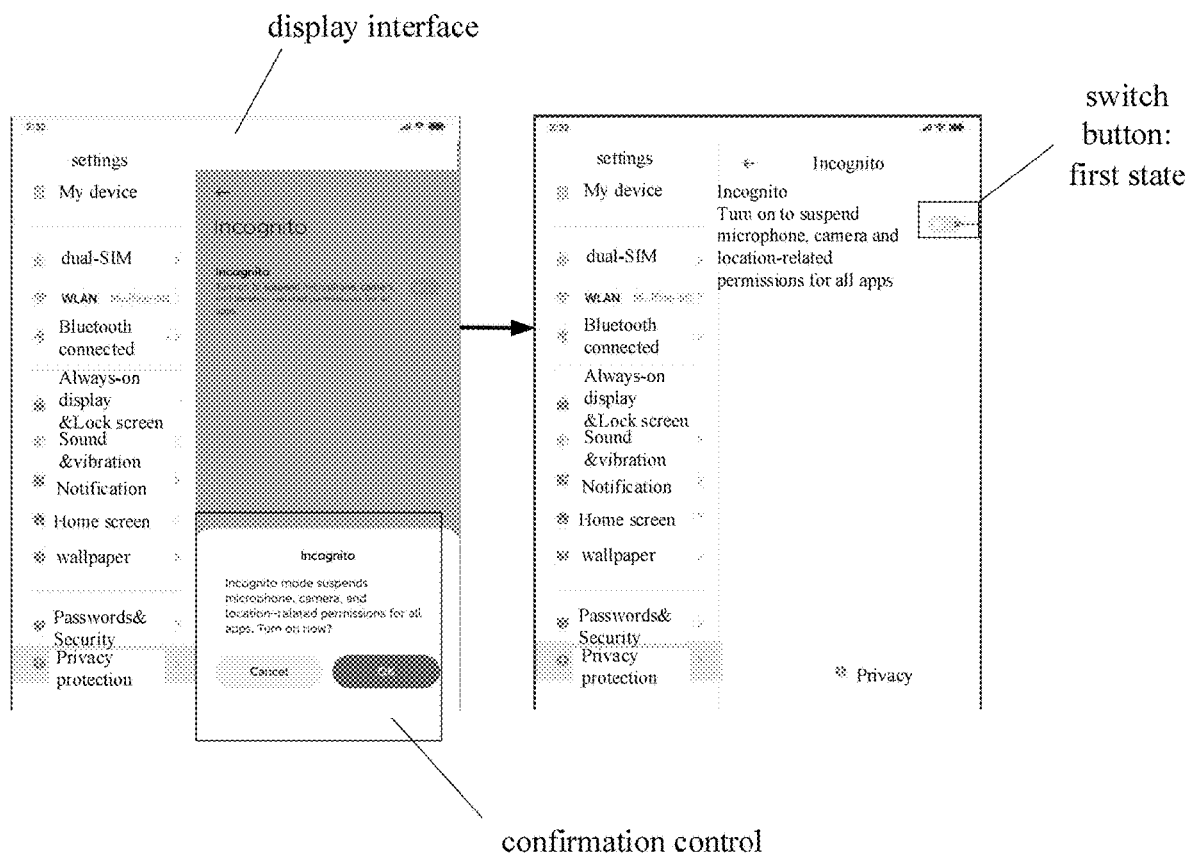
FIG. 4 is a diagram illustrating a method for setting a permission of an application according to some embodiments.

For example, referring to FIG. 3, a confirmation control is displayed on a display interface. The switch button is switched from the first state to the second state and the electronic device controls the permission of the predetermined application to be invalid, in response to the confirmation control detecting a confirmation operation for "confirmation" on the confirmation control. For another example, referring to FIG. 4, a confirmation control is displayed on a display interface. The switch button is not switched from the first state to the second state and the electronic device does not control the permission of the predetermined application to be invalid, in response to the confirmation control detecting a confirmation operation for "cancellation" on the confirmation control.

Figure 5:
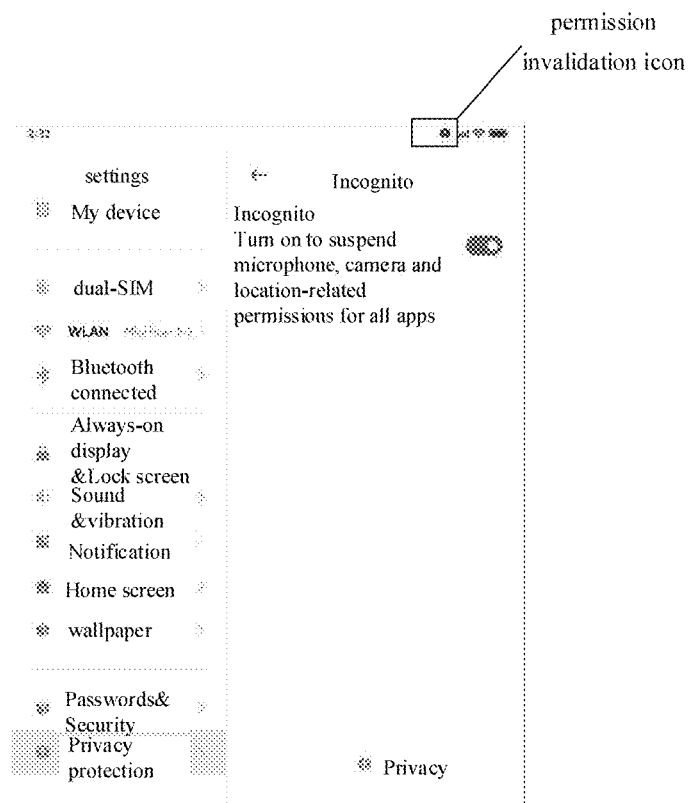
FIG. 5 is a diagram illustrating a method for setting a permission of an application according to some embodiments.

In some embodiments, referring to FIG. 5, the permission of the predetermined application is controlled to be invalid in response to detecting the first operation, and a permission invalidation icon is displayed on the display interface.

Figure 6:
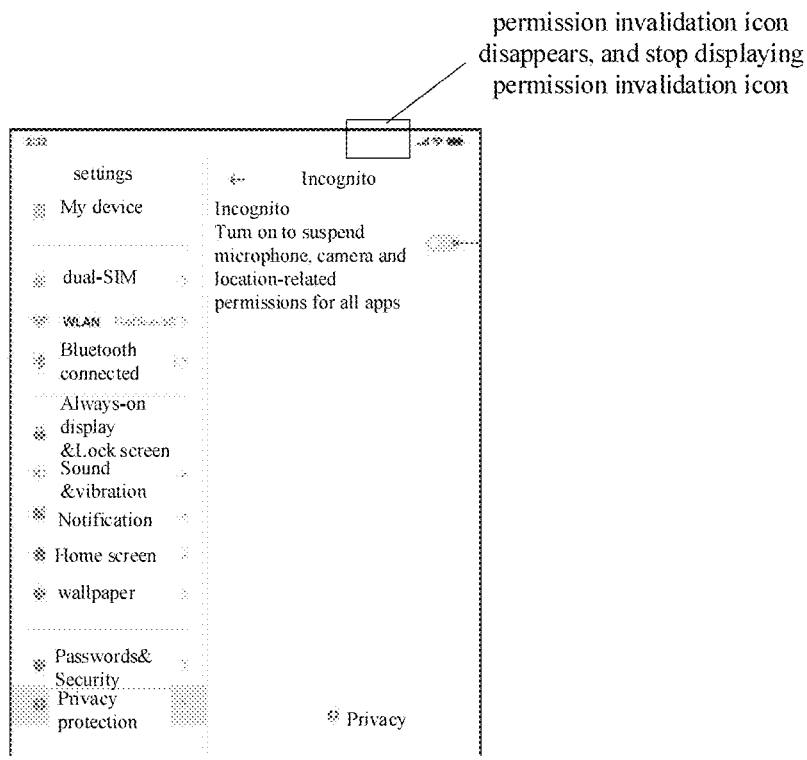
FIG. 6 is a diagram illustrating a method for setting a permission of an application according to some embodiments.

In some embodiments, referring to FIG. 6, the second operation on the first display control is detected; and the permission is controlled to be valid in response to detecting the second operation. Displaying the permission invalidation icon on the display interface is stopped.

In some embodiments, the electronic device is configured to be capable of using the predetermined application; the first operation on the first display control is detected; the permission of the predetermined application is controlled to be invalid in response to detecting the first operation; the permission includes the permission capable of using the predetermined application; and the predetermined application is disabled to be launched in response to the invalid permission.

In other embodiments, the electronic device is configured to be incapable of using the predetermined application; the first operation on the first display control is detected; the permission of the predetermined application is controlled to be invalid in response to detecting the first operation; the permission includes the permission incapable of using the predetermined application; and the predetermined application is disabled to be launched in response to the invalid permission.

In some embodiments, a prompt control of displaying that the permission is disabled is displayed on the display interface in response to the invalid permission. The prompt control is configured to display prompt information that the permission is disabled.

In some embodiments, prompt information that the permission is disabled is stopped from being displayed after the predetermined duration. For example, prompt information that the permission is disabled is stopped from being displayed after 3 seconds.

In some embodiments, there are a plurality of predetermined applications. The prompt control may simultaneously display prompt information that the plurality of predetermined applications are disabled. For example, prompt information "camera, recording and positioning applications are disabled" is displayed. The prompt information that the plurality of predetermined applications are disabled is displayed in a carousel. For example, prompt information "camera application is disabled", "recording application is disabled" and "positioning application is disabled" are displayed in carousel. In embodiments, the prompt information that the predetermined application is disabled may be displayed, and the prompt information which application is disabled may not be displayed. For example, prompt information of "an application is disabled" is displayed.

In some embodiments, an interface containing the first display control is displayed in response to the prompt control simultaneously displaying prompt information that the plurality of predetermined applications are disabled and receiving the click operation on the prompt control.

In other embodiments, an interface containing the first display control is displayed in response to the prompt control displaying in carousel prompt information that the plurality of predetermined applications are disabled and receiving the click operation on the prompt control.

In some embodiments, an interface containing a third display control is displayed in response to the prompt control displaying in carousel prompt information that the plurality of predetermined applications are disabled and receiving the click operation on the prompt control; in which the third display control is configured to control a permission of the single predetermined application to be valid or be invalid. The predetermined application corresponding to the carousel prompt information during the click operation is the single predetermined application.

In some embodiments, a search item is added in a search control on the interface of the electronic device, and the search item is configured to control displaying the first display control.

In some embodiments, the prompt control is displayed based on a preset frequency.

In some embodiments, the permission is configured to be valid in response to the electronic device being upgraded.

In embodiments of the disclosure, the first operation on the first display control is detected. The permission of the predetermined application is controlled to be invalid in response to detecting the first operation. The permission includes the permission capable of using the predetermined application or the permission incapable of using the predetermined application. The predetermined application is disabled to be launched in response to the invalid permission. After the permission is invalidated, the predetermined application may be disabled to be launched. In this way, even if it is preconfigured that it is capable of using the predetermined application, the predetermined application may not be reused after the permission is invalidated. Compared with the way of using the predetermined application in any scene after it is preconfigured that it is capable of using the predetermined application, privacy leakage caused by the use of the predetermined application in the corresponding scene may be reduced through the first operation.

It should be noted that, those skilled in the art may appreciate that the method provided in embodiments of the disclosure may be performed separately or may be performed together with some methods or some methods in the related art.

Figure 7:
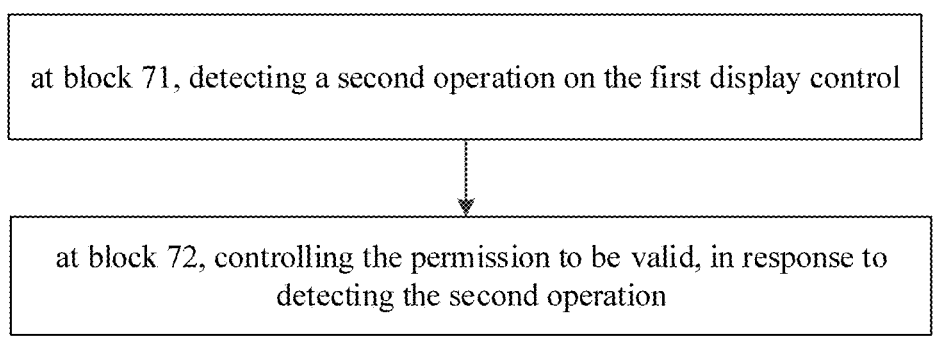
FIG. 7 is a flowchart illustrating a method for setting a permission of an application according to some embodiments.

FIG. 7 is a flowchart illustrating a method for setting a permission of an application according to some embodiments. As illustrated in FIG. 7, the method is applicable to an electronic device and includes the following.

At block 71, a second operation on the first display control is detected.

At block 72, the permission is controlled to be valid in response to detecting the second operation.

In some embodiments, the second operation may be a click operation, an input operation, a slide operation, or the like on the first display control on a touch screen of the electronic device. For example, the second operation may be the click operation on the first display control on the touch screen. For another example, the second operation may be the slide operation on the first display control on the touch screen.

In some embodiments, the first display control is configured with a switch button. The switch button has a first state of disabling (or closing) and a second state of enabling (or starting). The switch button may be switched between the first state and the second state based on the operation on the switch button.

In some embodiments, the switch button is switched from the first state to the second state in response to detecting the first operation on the switch button. The switch button is switched from the second state to the first state in response to detecting the second operation on the switch button.

In some embodiments, the switch button is switched from the second state to the first state in response to detecting the second operation on the first display control. The electronic device controls the permission of the predetermined application to be valid, in response to the switch button being switched from the second state to the first state.

In some embodiments, a confirmation control is displayed in response to detecting the second operation on the first display control; and the switch button is switched from the second state to the first state, and the electronic device controls the permission of the predetermined application to be valid, in response to detecting a confirmation operation for the confirmation control.

In other embodiments, a confirmation control is displayed in response to detecting the second operation on the first display control; and the switch button is not switched from the second state to the first state, and the electronic device does not control the permission of the predetermined application to be valid, in response to detecting a cancellation operation for the confirmation control.

In some embodiments, the permission of the predetermined application is controlled to be invalid in response to detecting the first operation, and a permission invalidation icon is displayed on the display interface. The second operation on the first display control is detected. The permission is controlled to be valid in response to detecting the second operation. Displaying a permission invalidation icon on the display interface is stopped.

It should be noted that, those skilled in the art may appreciate that the method provided in embodiments of the disclosure may be performed separately or may be performed together with some methods or some methods in the related art.

Figure 8:
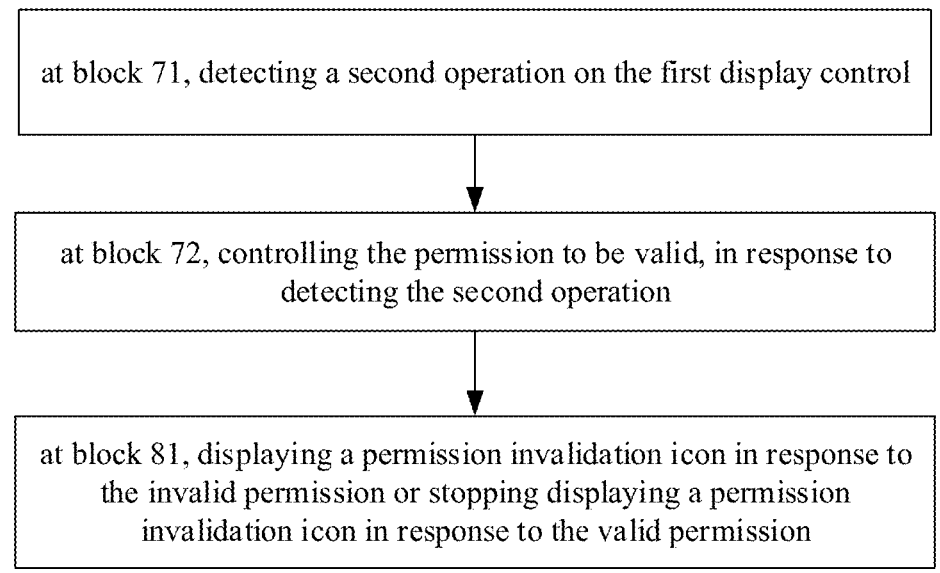
FIG. 8 is a flowchart illustrating a method for setting a permission of an application according to some embodiments.

FIG. 8 is a flowchart illustrating a method incorporating the method of FIG. 7 for setting a permission of an application according to some embodiments. As illustrated in FIG. 8, the method is applicable to an electronic device and includes the following.

At block 81, a permission invalidation icon is displayed in response to the invalid permission; and displaying a permission invalidation icon is stopped in response to the valid permission.

In some embodiments, the permission invalidation icon is displayed based on a predetermined frequency in response to the invalid permission, in which the predetermined frequency is greater than a frequency threshold.

In some embodiments, the permission invalidation icon is displayed and the permission invalidation icon is stopped from being displayed after the predetermined duration in response to the invalid permission.

It should be noted that, those skilled in the art may appreciate that the method provided in embodiments of the disclosure may be performed separately or may be performed together with some methods or some methods in the related art.

Figure 9:
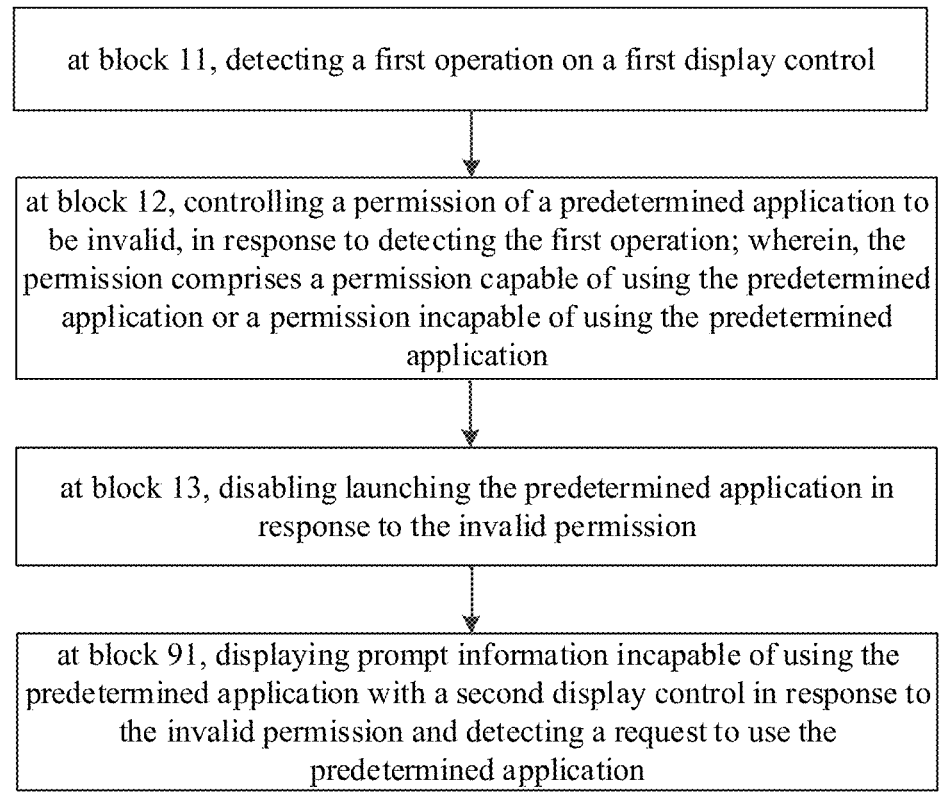
FIG. 9 is a flowchart illustrating a method for setting a permission of an application according to some embodiments.

FIG. 9 is a flowchart illustrating a method incorporating the method of FIG. 1 for setting a permission of an application according to some embodiments. As illustrated in FIG. 9, the method is applicable to an electronic device and includes the following.

At block 91, prompt information incapable of using the predetermined application is displayed with a second display control in response to the invalid permission and detecting a request to use the predetermined application.

In some embodiments, prompt information incapable of using the predetermined application is displayed with the second display control in response to the invalid permission and detecting a request to use the predetermined application that is triggered by an operation on the electronic device.

In some embodiments, prompt information incapable of using the predetermined application is displayed with the second display control in response to the invalid permission and detecting a request to use the predetermined application that is triggered and sent from another electronic device.

In some embodiments, prompt information incapable of using the predetermined application is displayed with the second display control in response to the invalid permission and detecting a request to use the predetermined application that is triggered and sent from another electronic device; and the prompt information incapable of using the predetermined application is sent to the other device.

It should be noted that, those skilled in the art may appreciate that the method provided in embodiments of the disclosure may be performed separately or may be performed together with some methods or some methods in the related art.

Figure 10:
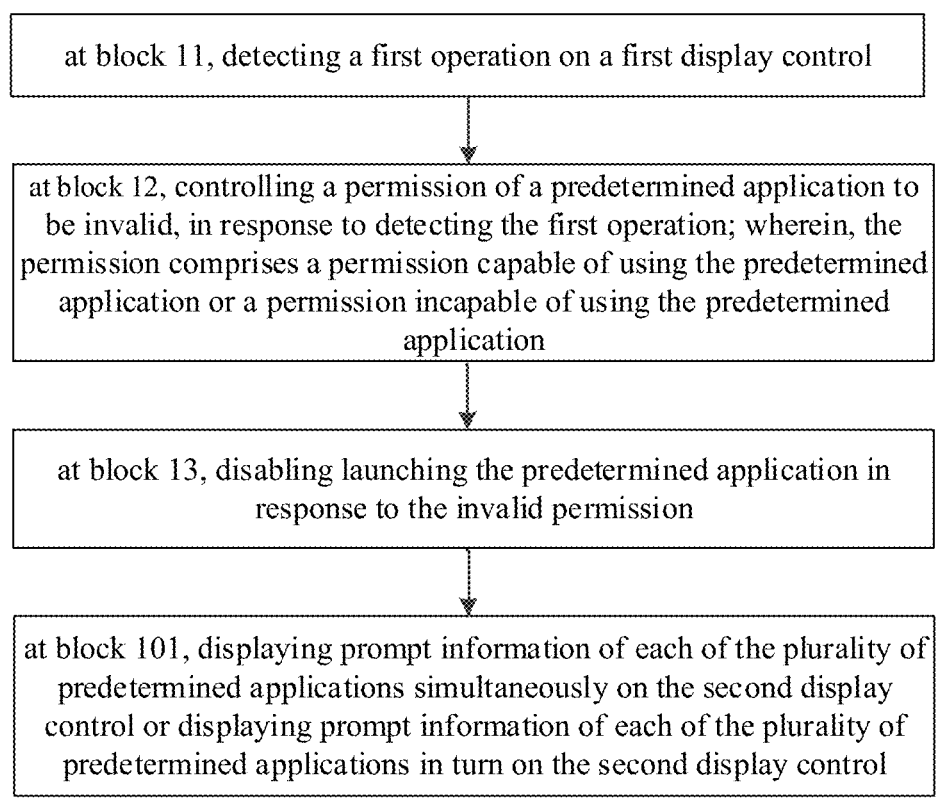
FIG. 10 is a flowchart illustrating a method for setting a permission of an application according to some embodiments.

FIG. 10 is a flowchart illustrating a method incorporating the method of FIG. 1 for setting a permission of an application according to some embodiments. As illustrated in FIG. 10, the method is applicable to an electronic device. There are a plurality of predetermined applications. Displaying the prompt information incapable of using the predetermined application with the second display control may include the following.

At block 101, prompt information of each of the plurality of predetermined applications is displayed simultaneously on the second display control, or prompt information of each of the plurality of predetermined applications is displayed in turn on the second display control.

In some embodiments, the prompt information of each of the plurality of predetermined applications is displayed in turn on the second display control in a cycle manner.

In some embodiments, there are the plurality of predetermined applications. The prompt control may simultaneously display the prompt information that the plurality of predetermined applications are disabled. For example, prompt information "camera, recording and positioning applications are disabled" is displayed on the second display control. The prompt information that the plurality of predetermined applications are disabled may be displayed in turn. For example, prompt information "camera application is disabled", "recording application is disabled" and "positioning application is disabled" are in turn displayed. The prompt information that the predetermined application is disabled may be displayed, and the prompt information which application is disabled may not be displayed. For example, prompt information "an application is disabled" is displayed.

Figure 11:
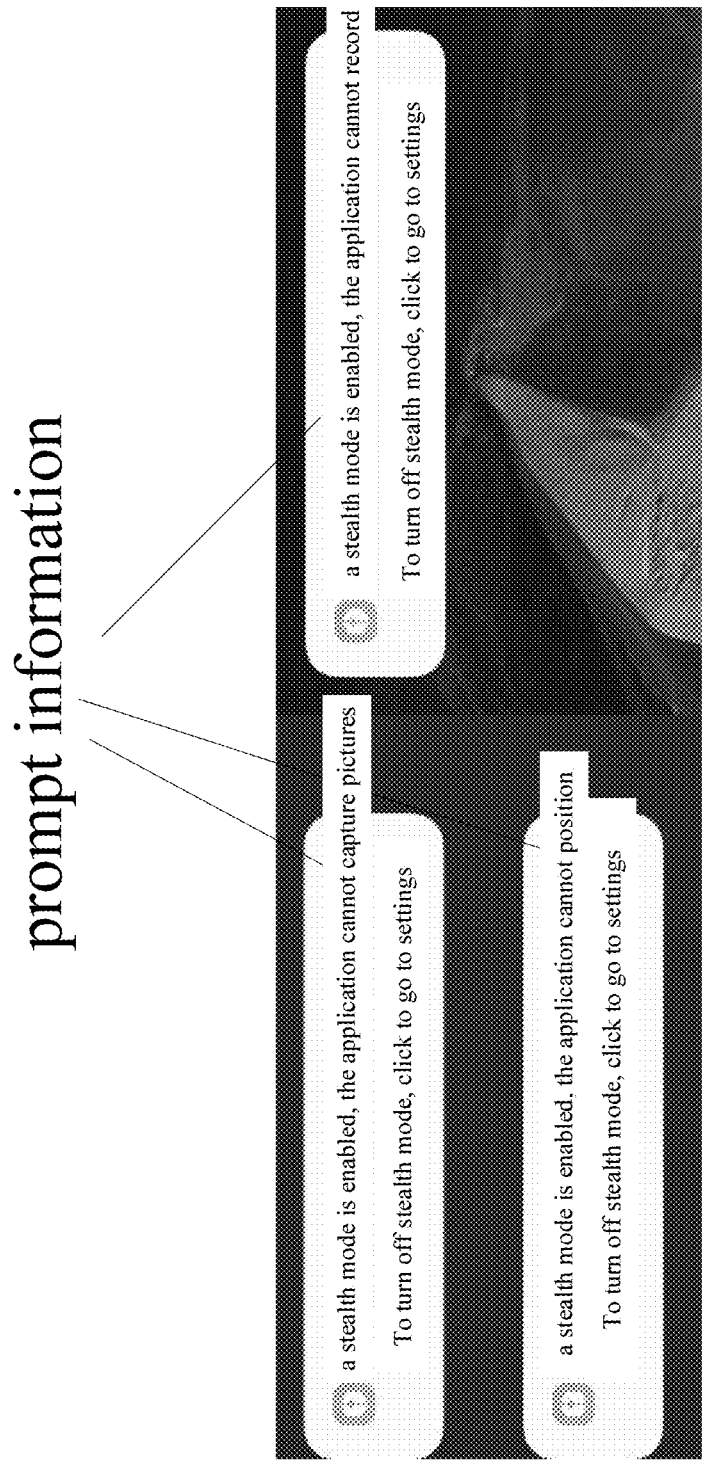
FIG. 11 is a diagram illustrating displaying a prompt message according to some embodiments.

For example, referring to FIG. 11, prompt information of recording application, capturing application and positioning application may be displayed in turn. The sequence of displaying prompt information in turn may be prompt information "a stealth mode is enabled, the application cannot record", prompt information "a stealth mode is enabled, the application cannot capture pictures", and prompt information "a stealth mode is enabled, the application cannot position". It may be that prompt information of the recording application; the capturing application and the positioning application may be displayed simultaneously. The prompt information "a stealth mode is enabled, the application cannot record", prompt information "a stealth mode is enabled, the application cannot capture pictures", and prompt information "a stealth mode is enabled, the application cannot position" are displayed simultaneously.

It should be noted that, those skilled in the art may appreciate that the method provided in embodiments of the disclosure may be performed separately or may be performed together with some methods or some methods in the related art.

Figure 12:
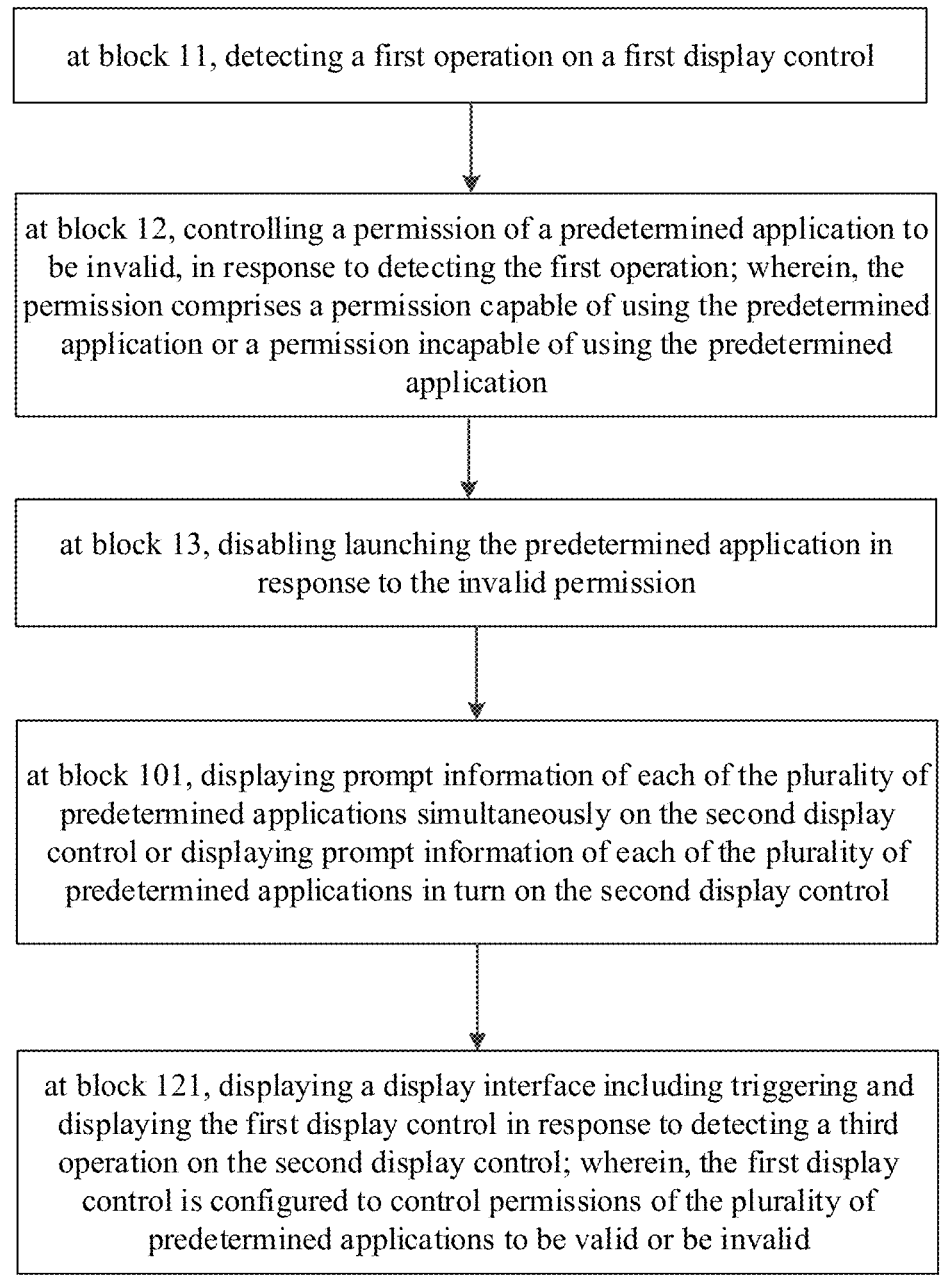
FIG. 12 is a flowchart illustrating a method for setting a permission of an application according to some embodiments.

FIG. 12 is a flowchart illustrating a method incorporating the method of FIG. 1 for setting a permission of an application according to some embodiments. As illustrated in FIG. 12, the method is applicable to an electronic device and includes the following.

At block 121, a display interface including triggering and displaying the first display control is displayed in response to detecting a third operation on the second display control.

The first display control is configured to control permissions of the plurality of predetermined applications to be valid or be invalid.

In some embodiments, the third operation may be a click operation, an input operation, a slide operation or the like on the second display control on the touch screen of the electronic device. For example, the third operation may be the click operation on the second display control on the touch screen. For another example, the third operation may be the slide operation on the second display control on the touch screen. The third operation may be a touch operation herein.

Figure 13:
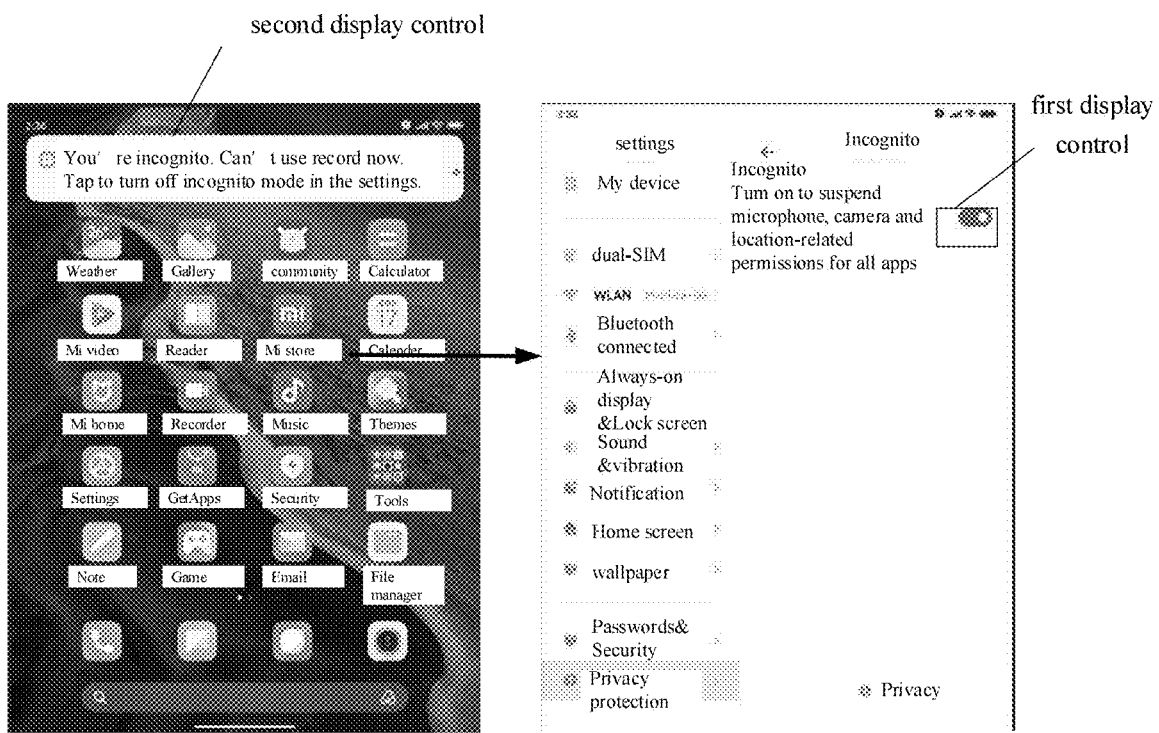
FIG. 13 is a diagram illustrating a method for setting a permission of an application according to some embodiments.

In some embodiments, referring to FIG. 13, a display interface including displaying and triggering the first display control is displayed, in response to detecting the click operation on the second prompt control; and the first display control is configured to control the permissions of the plurality of predetermined applications to be valid.

In some embodiments, a confirmation control is displayed in response to detecting the third operation on the second display control; and the display interface including displaying and triggering the first display control is displayed in response to detecting the confirmation operation for the confirmation control.

In other embodiments, a confirmation control is displayed in response to detecting the third operation on the second display control; and the display interface including displaying and triggering the first display control is not displayed in response to detecting the cancellation operation for the confirmation control.

In some embodiments, the first display control is configured with a switch button. The switch button has a first state of disabling (or closing) and a second state of enabling (or starting). The switch button may be switched between the first state and the second state based on the operation on the switch button.

In some embodiments, the switch button is switched from the second state to the first state in response to detecting the second operation on the first display control; and the electronic device controls the permission of the predetermined application to be valid in response to the switch button being switched from the second state to the first state.

It should be noted that, those skilled in the art may appreciate that the method provided in embodiments of the disclosure may be performed separately or may be performed together with some methods or some methods in the related art.

Figure 14:
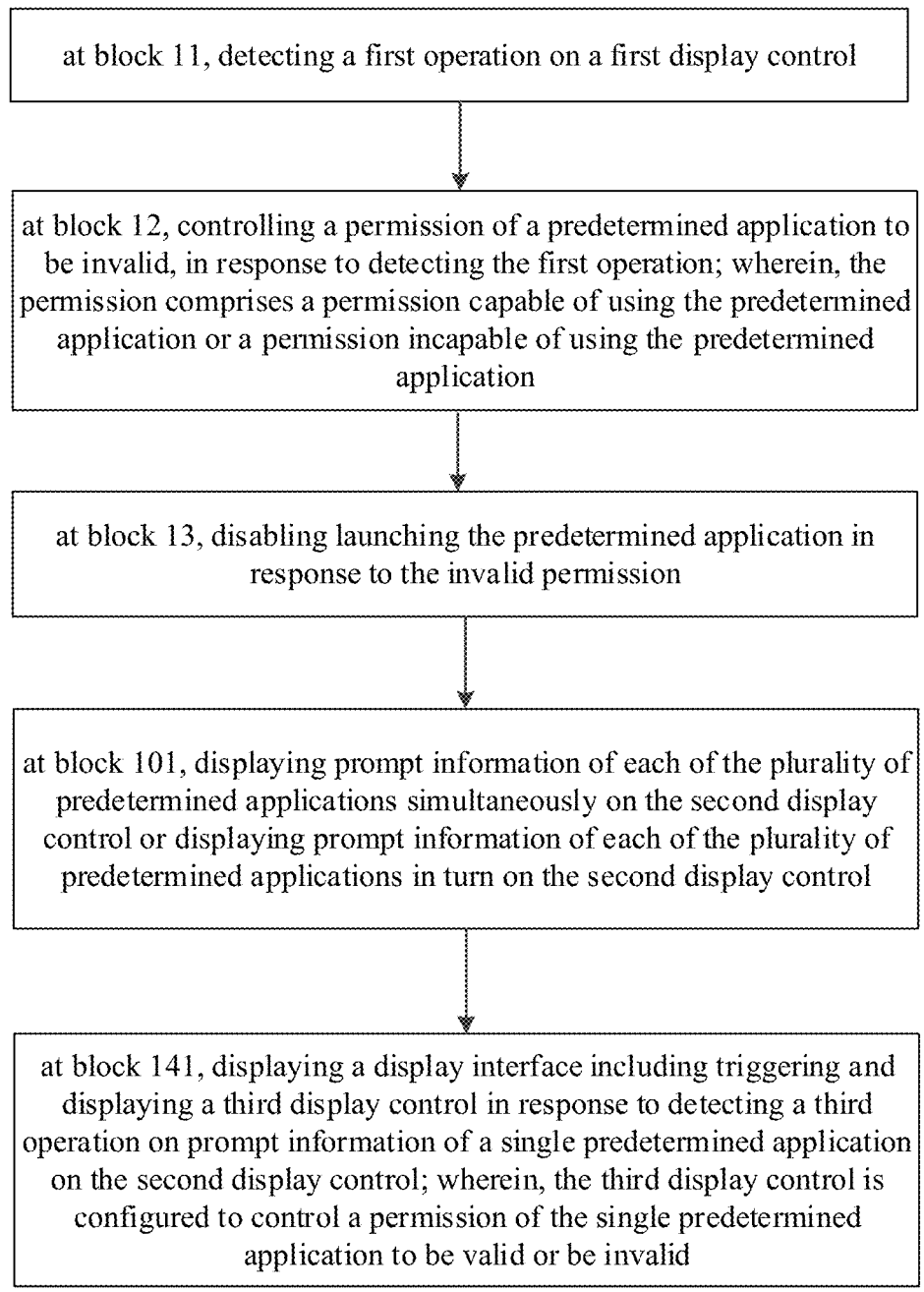
FIG. 14 is a flowchart illustrating a method for setting a permission of an application according to some embodiments.

FIG. 14 is a flowchart illustrating a method incorporating the method of FIG. 10 for setting a permission of an application according to some embodiments. As illustrated in FIG. 14, the method is applicable to an electronic device and includes the following.

At block 141, a display interface including triggering and displaying a third display control is displayed in response to detecting a third operation on prompt information of a single predetermined application on the second display control.

The third display control is configured to control a permission of the single predetermined application to be valid or be invalid.

In some embodiments, the prompt information of the single predetermined application on the second display control may be prompt information corresponding to any one application in the prompt information of the plurality of predetermined applications. For example, any one of prompt information "a stealth mode is enabled, the application cannot record", prompt information "a stealth mode is enabled, the application cannot capture pictures", and prompt information "a stealth mode is enabled, the application cannot position" in FIG. 11.

For example, the display interface including displaying and triggering the third display control is displayed in response to detecting the third operation on the prompt information "a stealth mode is enabled, the application cannot record" of the recording application on the second display control; and the third display control is configured to control the permission of the recording application to be valid or invalid.

In some embodiments, a confirmation control is displayed in response to detecting the third operation on the single predetermined application on the second display control; and the display interface including displaying and triggering the third display control is displayed in response to detecting the confirmation operation for the confirmation control.

In other embodiments, a confirmation control is displayed in response to detecting the third operation on the single predetermined application on the second display control; and the display interface including displaying and triggering the third display control is not displayed in response to detecting the cancellation operation for the confirmation control.

In some embodiments, the third display control is configured with a switch button. The switch button has a first state of disabling (or closing) and a second state of enabling (or starting). The switch button may be switched between the first state and the second state based on the operation on the switch button.

In some embodiments, the switch button is switched from the second state to the first state in response to detecting the second operation on the third display control. The electronic device controls the permission of the single predetermined application to valid in response to the switch button being switched from the second state to the first state.

It should be noted that, those skilled in the art may appreciate that the method provided in embodiments of the disclosure may be performed separately or may be performed together with some methods or some methods in the related art.

Figure 15:
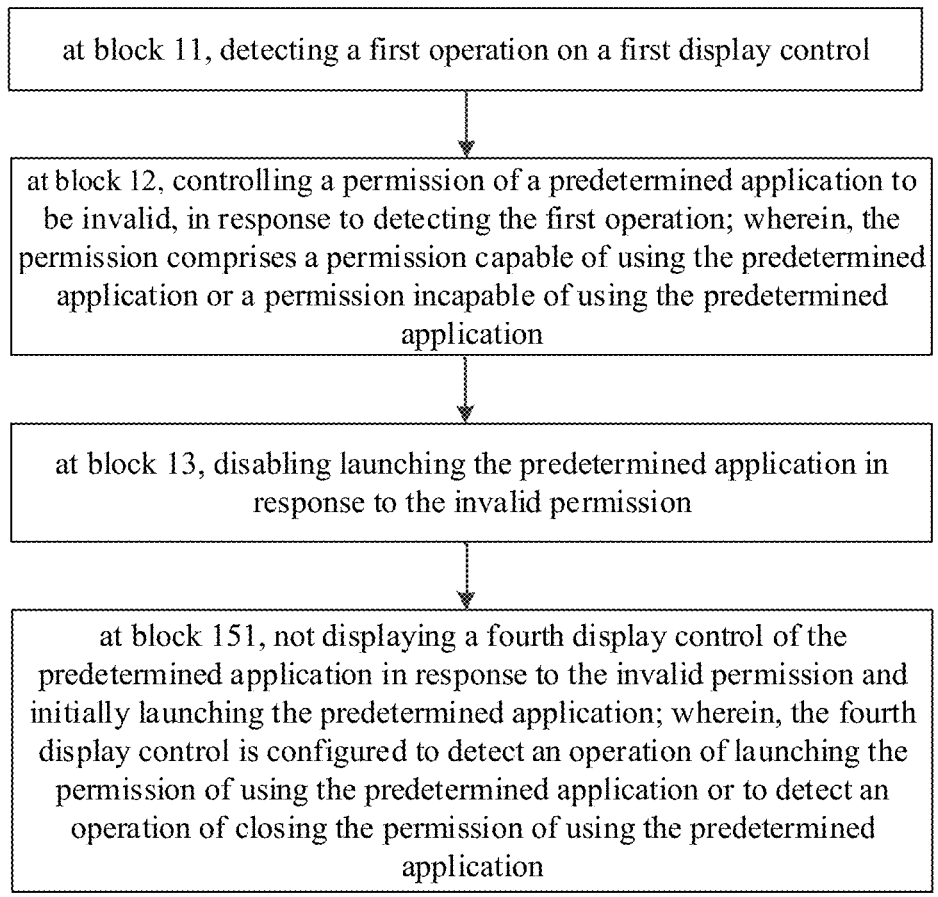
FIG. 15 is a flowchart illustrating a method for setting a permission of an application according to some embodiments.

FIG. 15 is a flowchart illustrating a method incorporating the method of FIG. 1 for setting a permission of an application according to some embodiments. As illustrated in FIG. 15, the method is applicable to an electronic device and includes the following.

At block 151, a fourth display control of the predetermined application is not displayed in response to the invalid permission and initially launching the predetermined application.

The fourth display control is configured to detect an operation of launching the permission of using the predetermined application or to detect an operation of closing the permission of using the predetermined application.

In some embodiments, the fourth display control is configured with a switch button. The switch button has a first state of disabling (or closing) and a second state of enabling (or starting). The switch button may be switched between the first state and the second state based on the operation on the switch button.

In some embodiments, the switch button is switched from the first state to the second state in response to detecting the start operation on the fourth display control. The electronic device controls to be capable of using the predetermined application in response to the switch button being switched from the first state to the second state.

In some embodiments, the switch button is switched from the second state to the first state in response to detecting the close operation on the fourth display control. The electronic device controls to be incapable of using the predetermined application in response to the switch button being switched from the second state to the first state.

It should be noted that, those skilled in the art may appreciate that the method provided in embodiments of the disclosure may be performed separately or may be performed together with some methods or some methods in the related art.

In some embodiments, the predetermined application includes one or more of: applications for positioning, applications for capturing images or applications for recording.

Figure 16:
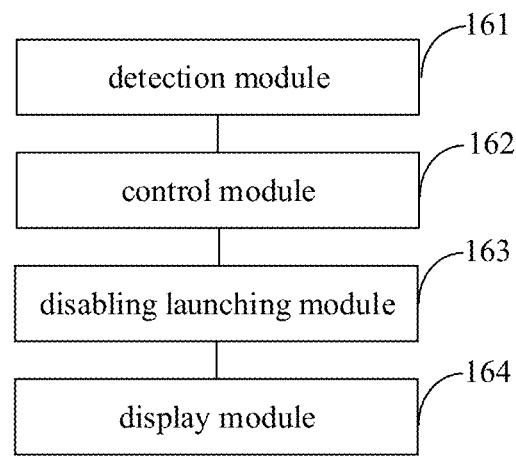
FIG. 16 is a block diagram illustrating an apparatus for setting a permission of an application according to some embodiments.

FIG. 16 is a block diagram illustrating an apparatus for setting a permission of an application according to some embodiments. The apparatus is applicable to an electronic device. The apparatus includes a detection module 161, a control module 162 and a disabling launching module 163.

The detection module 161 is configured to detect a first operation on a first display control.

The control module 162 is configured to control a permission of a predetermined application to be invalid, in response to detecting the first operation; in which, the permission includes a permission capable of using the predetermined application or a permission incapable of using the predetermined application.

The disabling launching module 163 is configured to disable launching the predetermined application in response to the invalid permission.

In some embodiments, the detection module 161 is further configured to detect a second operation on the first display control; and the control module 162 is further configured to control the permission to be valid, in response to detecting the second operation In some embodiments, the apparatus further includes a display module 164.

The display module 164 is configured to: display a permission invalidation icon in response to the invalid permission; or stop displaying a permission invalidation icon in response to the valid permission.

In some embodiments, the display module 164 is further configured to: display prompt information incapable of using the predetermined application with a second display control in response to the invalid permission and detecting a request to use the predetermined application.

In some embodiments, there are a plurality of predetermined applications; and the display module 164 is further configured to: display prompt information of each of the plurality of predetermined applications simultaneously on the second display control, or display prompt information of each of the plurality of predetermined applications in turn on the second display control.

In some embodiments, the display module 164 is further configured to: display a display interface including triggering and displaying the first display control in response to detecting a third operation on the second display control; in which the first display control is configured to control permissions of the plurality of predetermined applications to be valid or be invalid.

In some embodiments, the display module 164 is further configured to: display a display interface including triggering and displaying a third display control in response to detecting a third operation on prompt information of a single predetermined application on the second display control, in which the third display control is configured to control a permission of the single predetermined application to be valid or be invalid.

In some embodiments, the display module 164 is further configured to: not display a fourth display control of the predetermined application in response to the invalid permission and initially launching the predetermined application; in which the fourth display control is configured to detect an operation of launching the permission of using the predetermined application or to detect an operation of closing the permission of using the predetermined application.

It should be noted that, those skilled in the art may appreciate that the method provided in embodiments of the disclosure may be performed separately or may be performed together with some methods or some methods in the related art.

Figure 17:
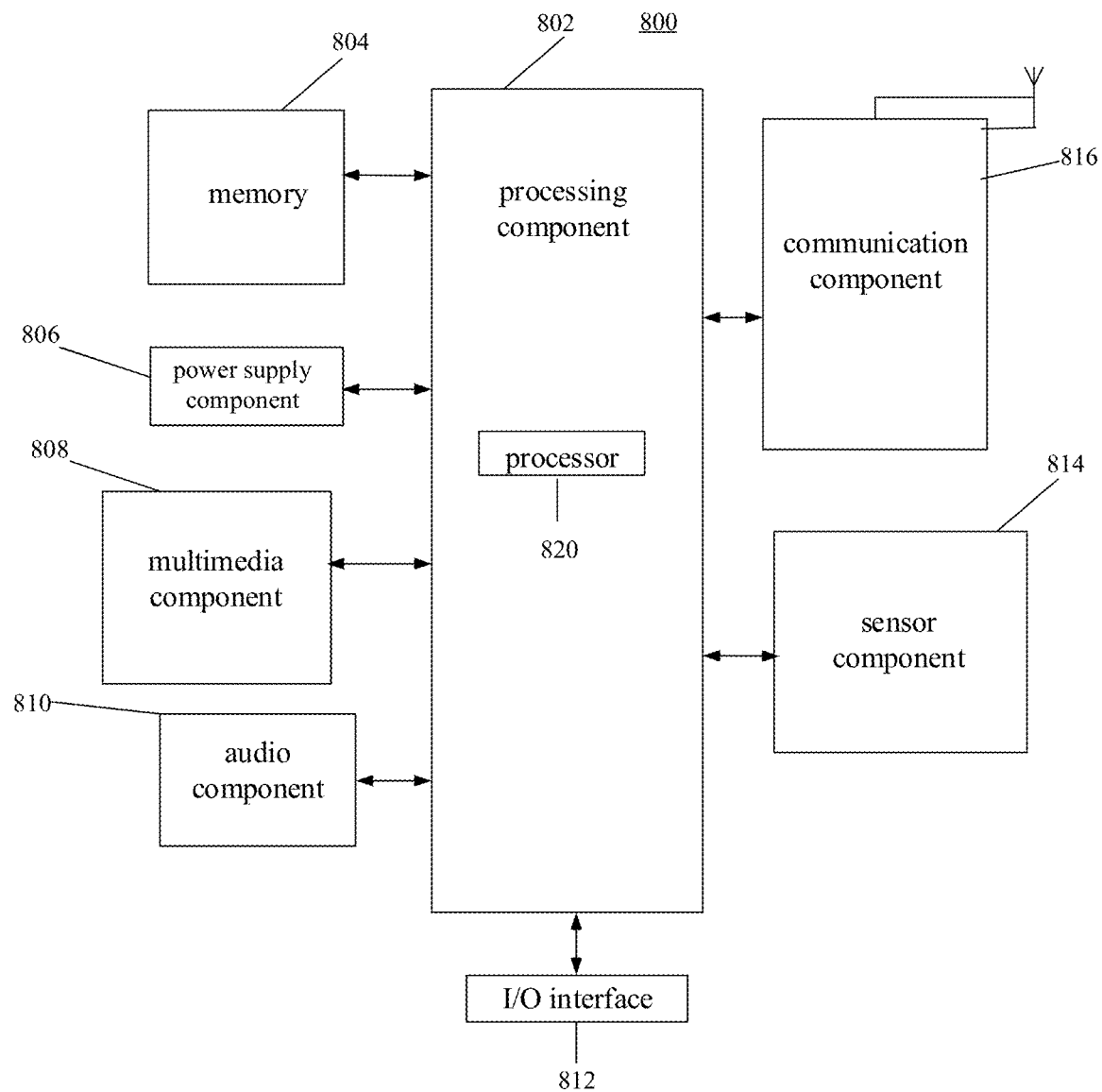
FIG. 17 is a block diagram illustrating a display device according to some embodiments.

FIG. 17 is a block diagram illustrating a display device 800 according to some embodiments. For example, a display device 800 may be a mobile phone, a computer, a digital broadcasting terminal, a messaging device, a game console, a tablet device, a medical equipment, fitness equipment, a personal digital assistant, etc.

Referring to FIG. 17, the display device 800 may include one or more components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the actions in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G; or 3G; or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium is further provided. When the instructions in the storage medium are executed by a processor of a display device, the display device may execute the method as described in the above embodiments.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for setting a permission of an application, for an electronic device, comprising:

detecting a first operation on a first display control, wherein the first display control is configured on a setting interface for system settings of the electronic device, a page containing the first display control is entered from a stealth functional module of a setting page by receiving a predetermined operation, the first display control is configured with a switch button, the switch button has a first state of disabling and a second state of enabling, and the switch button is switched between the first state and the second state based on an operation on the switch button;

switching the switch button from the first state to the second state in response to detecting the first operation on the first display control and controlling a permission of a predetermined application to be invalid; wherein, the permission comprises a permission capable of using the predetermined application or a permission incapable of using the predetermined application; and disabling launching the predetermined application in response to the invalid permission;

detecting a second operation on the first display control; and switching the switch button from the second state to the first state in response to detecting the second operation on the first display control and controlling the permission to be valid, wherein the method further comprises:

displaying prompt information incapable of using the predetermined application with a second display control in response to the invalid permission and detecting a request to use the predetermined application, wherein a third operation on the second display causes the electronic device to display a display interface including triggering and displaying the first display control or a third display control to control the permission of the predetermined application.

2. The method as claimed in claim 1, further comprising:

displaying a permission invalidation icon in response to the invalid permission;

or, stopping displaying a permission invalidation icon in response to the valid permission.

3. The method as claimed in claim 1, wherein, there are a plurality of predetermined applications; and displaying the prompt information incapable of using the predetermined application with the second display control, comprises:

displaying prompt information of each of the plurality of predetermined applications simultaneously on the second display control;

or, displaying prompt information of each of the plurality of predetermined applications in turn on the second display control.

4. The method as claimed in claim 3, further comprising:
displaying a display interface including triggering and displaying the first display control in response to detecting the third operation on the second display control;
wherein, the first display control is configured to control permissions of the plurality of predetermined applications to be valid or be invalid.

5. The method as claimed in claim 3, further comprising:
displaying a display interface including triggering and displaying the third display control in response to detecting the third operation on prompt information of a single predetermined application on the second display control;
wherein, the third display control is configured to control a permission of the single predetermined application to be valid or be invalid.

6. The method as claimed in claim 1, further comprising:
not displaying a fourth display control of the predetermined application in response to the invalid permission and initially launching the predetermined application;
wherein, the fourth display control is configured to detect an operation of launching the permission of using the predetermined application or to detect an operation of closing the permission of using the predetermined application.

7. The method as claimed in claim 1, wherein, the predetermined application comprises one or more of: applications for positioning, applications for capturing images or applications for recording.

8. An electronic device, comprising:
a processor; and
a memory configured to store computer services capable of running on the processor,
wherein, the processor is configured to:
detect a first operation on a first display control, wherein the first display control is configured on a setting interface for system settings of the electronic device, a page containing the first display control is entered from a stealth functional module of a setting page by receiving a predetermined operation, the first display control is configured with a switch button, the switch button has a first state of disabling and a second state of enabling, and the switch button is switched between the first state and the second state based on an operation on the switch button;
switch the switch button from the first state to the second state in response to detecting the first operation on the first display control and control a permission of a predetermined application to be invalid; wherein, the permission comprises a permission capable of using the predetermined application or a permission incapable of using the predetermined application; and disable launching the predetermined application in response to the invalid permission;
detect a second operation on the first display control; and
switch the switch button from the second state to the first state in response to detecting the second operation on the first display control and control the permission to be valid;

wherein the processor is further configured to:
display prompt information incapable of using the predetermined application with a second display control in response to the invalid permission and detecting a request to use the predetermined application, wherein a third operation on the second display causes the electronic device to display a display interface including triggering and displaying the first display control or a third display control to control the permission of the predetermined application.

9. The device as claimed in claim 8, wherein the processor is configured to:
display a permission invalidation icon in response to the invalid permission;
or,
stop displaying a permission invalidation icon in response to the valid permission.

10. The device as claimed in claim 8, wherein, there are a plurality of predetermined applications; and the processor is configured to:
display prompt information of each of the plurality of predetermined applications simultaneously on the second display control;
or,
display prompt information of each of the plurality of predetermined applications in turn on the second display control.

11. The device as claimed in claim 10, wherein the processor is configured to:
display a display interface including triggering and displaying the first display control in response to detecting the third operation on the second display control;
wherein, the first display control is configured to control permissions of the plurality of predetermined applications to be valid or be invalid.

12. The device as claimed in claim 8, wherein the processor is configured to:
not display a fourth display control of the predetermined application in response to the invalid permission and initially launching the predetermined application;
wherein, the fourth display control is configured to detect an operation of launching the permission of using the predetermined application or to detect an operation of closing the permission of using the predetermined application.

13. A non-transitory computer-readable storage medium having stored therein instructions that, when executed by a processor of a mobile terminal, causes the mobile terminal to perform a method for setting a permission of an application, the method comprising
detecting a first operation on a first display control, wherein the first display control is configured on a setting interface for system settings of the mobile terminal, a page containing the first display control is entered from a stealth functional module of a setting page by receiving a predetermined operation, the first display control is configured with a switch button, the switch button has a first state of disabling and a second state of enabling, and the switch button is switched between the first state and the second state based on an operation on the switch button;
switching the switch button from the first state to the second state in response to detecting the first operation on the first display control and controlling a permission of a predetermined application to be invalid; wherein, the permission comprises a permission capable of using the predetermined application or a permission incapable of using the pre determined application; and disabling launching the predetermined application in response to the invalid permission;

detecting a second operation on the first display control; and switching the switch button from the second state to the first state in response to detecting the second operation on the first display control and controlling the permission to be valid, wherein the method further comprises:

displaying prompt information incapable of using the predetermined application with a second display control in response to the invalid permission and detecting a request to use the predetermined application, wherein a third operation on the second display causes the mobile terminal to display a display interface including triggering and displaying the first display control or a third display control to control the permission of the predetermined application.

14. The non-transitory computer-readable storage medium as claimed in claim 13, wherein the method further comprises:

displaying a permission invalidation icon in response to the invalid permission;

or, stopping displaying a permission invalidation icon in response to the valid permission.

* * * * *